United States Patent [19]
Schroeter et al.

[11] Patent Number: 5,676,048
[45] Date of Patent: Oct. 14, 1997

[54] GAS BARBECUE ASSEMBLY

[75] Inventors: Wolfgang Schroeter, Midhurst; Cliff Lilley, Anten Mills; Steven Schwarz, Barrie, all of Canada

[73] Assignee: Napolean Appliance Corporation, Barrie, Canada

[21] Appl. No.: 714,538

[22] Filed: Sep. 16, 1996

Related U.S. Application Data

[62] Division of Ser. No. 470,418, Jun. 6, 1995, Pat. No. 5,617,778.

[30] Foreign Application Priority Data

Jun. 1, 1995 [CA] Canada ................................. 2150768

[51] Int. Cl.⁶ ......................................................... A47J 37/08
[52] U.S. Cl. .............................. 99/385; 99/401; 99/447; 126/41 R
[58] Field of Search ............................. 99/385, 400, 401, 99/446, 447; 126/41 R

[56] References Cited

U.S. PATENT DOCUMENTS

| Re. 32,288 | 11/1986 | Berger | 99/385 |
|---|---|---|---|
| 923,348 | 6/1909 | Fey. | |
| 1,010,169 | 11/1911 | Noreck. | |
| 1,103,992 | 7/1914 | Murray. | |
| 1,133,850 | 3/1915 | Garraux. | |
| 1,224,157 | 5/1917 | Fry. | |
| 1,504,102 | 8/1924 | Davis. | |
| 1,954,476 | 4/1934 | Gloekler | 158/104 |
| 2,304,140 | 12/1942 | Bergholm | 126/39 |
| 2,881,695 | 4/1959 | Di Pietro | 99/446 |
| 2,905,077 | 9/1959 | Del Francia | 99/446 |
| 3,348,472 | 10/1967 | Anetsberger et al. | 99/447 |
| 3,418,921 | 12/1968 | Fautz | 99/445 |
| 3,474,724 | 10/1969 | Jenn | 99/259 |
| 3,586,518 | 6/1971 | Folmar | 99/259 |
| 3,638,634 | 2/1972 | Bolitho | 126/41 R |
| 3,771,510 | 11/1973 | Short | 126/41 R |
| 4,089,258 | 5/1978 | Berger | 99/339 |
| 4,305,372 | 12/1981 | Hahn | 126/41 R |
| 4,321,857 | 3/1982 | Best | 99/340 |
| 4,402,300 | 9/1983 | Houck | 126/41 R |
| 4,485,972 | 12/1984 | Freber | 239/553.3 |
| 4,493,308 | 1/1985 | Hurley et al. | 126/41 R |
| 4,727,853 | 3/1988 | Stephen et al. | 126/41 R |
| 4,741,321 | 5/1988 | Squires | 126/41 R X |
| 4,787,364 | 11/1988 | Zepeda | 126/41 R |
| 4,815,439 | 3/1989 | Houck | 126/39 G |
| 4,827,903 | 5/1989 | Kim | 126/299 R |
| 4,878,477 | 11/1989 | McLane | 126/41 R |
| 4,899,724 | 2/1990 | Kuechler | 126/41 R |
| 4,909,137 | 3/1990 | Brugnoli | 99/444 |
| 5,000,157 | 3/1991 | Harper, Jr. et al. | 126/41 R X |
| 5,009,151 | 4/1991 | Hungerford | 99/445 |
| 5,105,725 | 4/1992 | Haglund | 99/446 |
| 5,111,803 | 5/1992 | Barker et al. | 126/41 R |
| 5,117,747 | 6/1992 | Kuechler | 126/41 R X |
| 5,121,676 | 6/1992 | Jurgens | 99/340 |
| 5,127,824 | 7/1992 | Barker | 431/284 |
| 5,129,312 | 7/1992 | Berger | 99/447 X |
| 5,211,105 | 5/1993 | Liu | 99/446 |
| 5,242,704 | 9/1993 | Prestigiacomo | 426/523 |
| 5,265,586 | 11/1993 | Salerno | 126/41 R |
| 5,277,106 | 1/1994 | Raymer et al. | 99/447 |
| 5,347,978 | 9/1994 | Zuran | 126/41 R |
| 5,536,518 | 7/1996 | Rummel | 99/447 X |

FOREIGN PATENT DOCUMENTS 1300994  5/1992  Canada.

Primary Examiner—David Scherbel
Assistant Examiner—Reginald L. Alexander
Attorney, Agent, or Firm—Merek & Voorhees

[57] ABSTRACT

A gas barbecue having a rectangular body, gas control means, a cooking grill, and a burner assembly. The burner assembly includes an elongate tube burner and a generally L-shaped tube burner having a primary tube member and a secondary tube member intersecting the primary tube member thereby forming the general L shape. The free end of the secondary tube member is positioned in close proximity to the elongate tube burner such that the ignition of the elongate tube burner causes cross-ignition of the L-shaped tube burner when gas is supplied thereto.

16 Claims, 7 Drawing Sheets

GAS BARBECUE ASSEMBLY

This is a division of application Ser. No. 08/470,418, filed Jun. 6, 1995 now U.S. Pat. No. 5,677,778.

FIELD OF THE INVENTION

This invention relates generally to barbecues of the type used for cooking food items, and more particularly barbecues using propane or natural gas as their fuel supply.

BACKGROUND OF THE INVENTION

Cooking food over an open flame is a method of food preparation enjoyed by many due to the enhanced flavour and aroma associated with barbecuing. This is particularly so in the case of cooking meats where the grease and drippings from the meat are burned or seared to impart onto the meat a smoked flavour.

On account of the popularity of barbecuing food numerous types of barbecues and similar devices have been developed. Early barbecues typically used wood or charcoal as a source of fuel, however, in recent years natural gas and propane have become the fuel of choice. The clean burning flame and the instant heat created by burning gaseous fuels have resulted in gas barbecues becoming extremely popular outdoor cooking devices and displacing wood and charcoal barbecues from much of the marketplace.

The typical gas barbecue is comprised of a housing with one or more gas burners. These burners typically have a number of apertures or orifices through which gas is released and ignited in order to produce a flame for cooking and heating purposes. The supply of gas to the burner is regulated by a control valve such that the intensity of the flame and the amount of heat generated can be varied. A form of cooking grill is typically positioned above the burner to provide a cooking surface for the food. One of the main problems encountered when using gas barbecues is a result of grease drippings that fall from meat cooked on the grill down into the barbecue housing. If the drippings come into contact with either the burners or the open flame they can become ignited presenting a dangerous situation. Flare ups caused by the ignition of grease drippings also can result in the charing of food on the grill.

Another problem encountered with modern forms of gas barbecues relates to the manner in which the burners are ignited. Many barbecues are constructed with two or more separate burners so that when cooking small amounts of food the entire burner system need not be ignited thereby conserving fuel. The problem that exists is in providing a means or method to ignite the burners independently of one another. Others have developed various forms of electronic ignition devices to accomplish this while still others have positioned the burners near the external edges of the barbecue housing such that a lit match can be used to ignite a particular burner. Yet others have developed complex pilot tubes which carry gas from one burner to the next in order to cross-ignite the burners. While all of these methods function at various degrees of efficiency, each suffers from its own inherent limitations ranging from the potential for explosion and burning in the case of ignition by way of a lit match, to complexity and expense in the cases of electronic and pilot tube igniters.

SUMMARY OF THE INVENTION

Accordingly, the present invention, in one of its aspects, provides a gas barbecue comprising: a housing having a generally rectangular shape with opposing side and end walls, an open interior and an open top; gas control means; a cooking grill; and a burner assembly, said burner assembly comprising an elongate tube burner, having first and second ends, said elongate tube burner having at least one row of apertures extending along its periphery and having said first end connected to said gas control means and said second end fastened to said housing, and at least one generally L-shaped tube burner comprised of a primary tube member, having first and second ends, and a secondary tube member, said secondary tube member having an intersecting end and a free end, said intersecting end of said secondary tube member being joined to said second end of said primary tube member to form a continuous tube burner having said generally L-shape, said L-shaped tube burner positioned within said housing such that said first end of said primary tube member is connected to said gas control means and said free end of said secondary tube member is in close proximity to said second end of said elongate tube burner such that ignition of said elongate tube burner causes cross-ignition of said L-shaped tube burner when gas is supplied thereto.

In a further aspect the present invention provides for a gas barbecue comprising: a housing having a generally rectangular shape with opposing side and end walls, an open interior, and an open top; a burner assembly mounted within said open interior of said housing; control means to regulate the flow of gas to said burner assembly; a cooking grill positioned above said burner assembly on first support means; and at least one sear plate, said sear plate positioned on second support means between said burner assembly and said cooking grill and comprised of a series of adjacent and connected wall portions forming an undulating surface of elongate ridges and troughs for catching and searing grease drippings from said cooking grill thereby releasing vapour to enhance the flavour of food cooked on said cooking grill, wherein said adjacent and connected wall portions comprising said sear plate form obtuse angles therebetween.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 1:
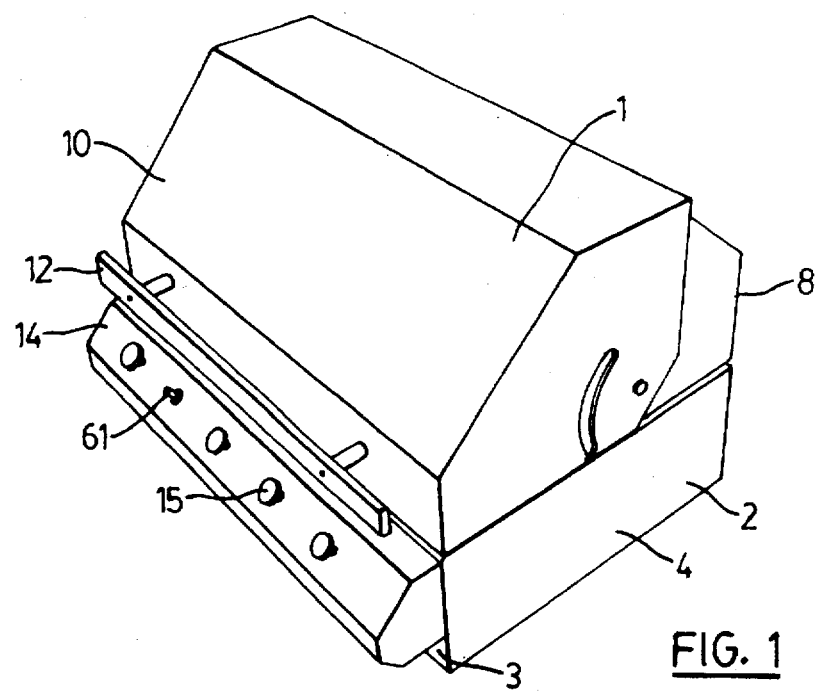
FIG. 1 is a perspective view of the gas barbecue according to the present invention.
Figure 2:
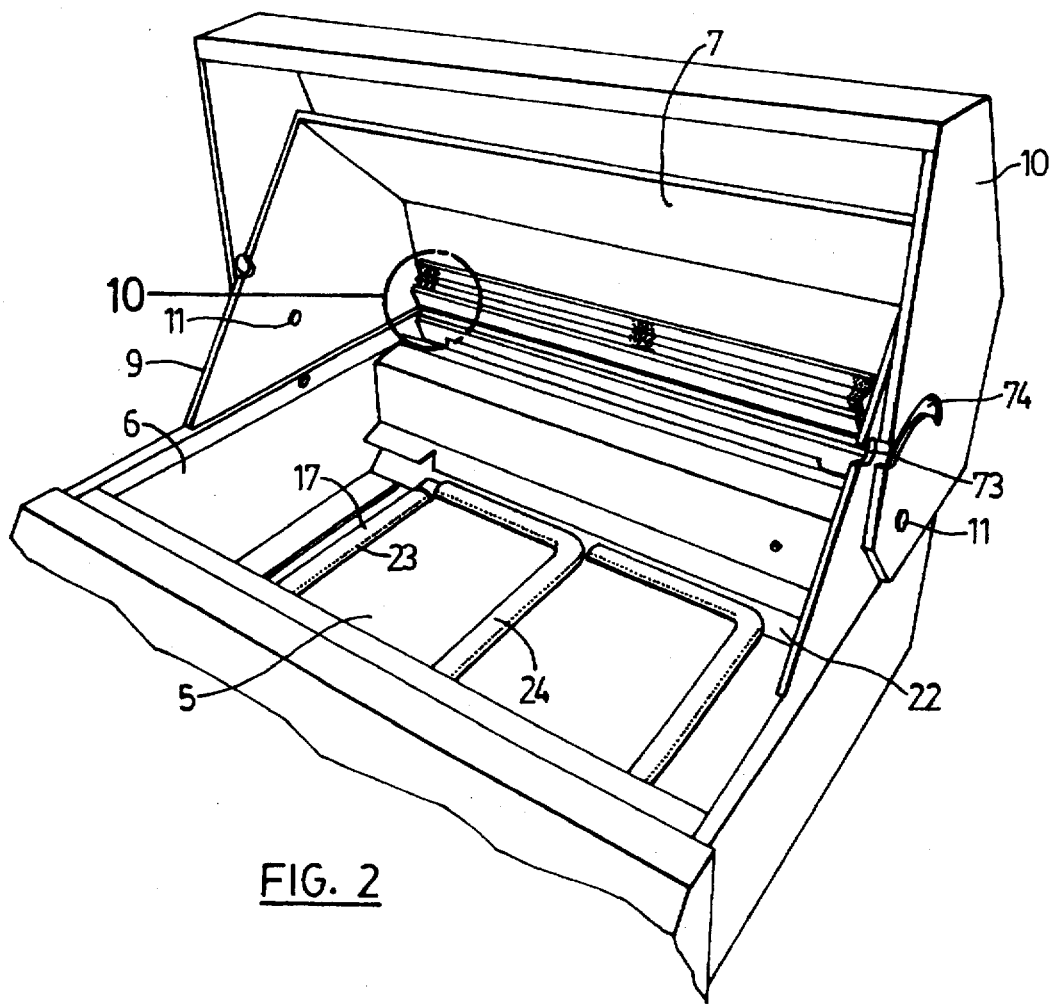
FIG. 2 is a view of the interior of the gas barbecue of FIG. 1.

Referring to FIGS. 1 and 2, the gas barbecue pursuant to the present invention is generally identified by the reference number 1. Gas barbecue 1 is comprised of a housing 2 having a generally rectangular shape with opposing side walls 3, opposing end walls 4, an open interior 5 and an open top 6. As indicated generally in FIGS. 1 and 2, housing 2 is preferably comprised of sheet metal components that are mechanically fastened together by any number of presently known methods, including welding, bolting and rivetting. However, housing 2 could equally be a cast product.

Mounted on the top and rear portion of housing 2 is a fixed rear draft hood 7. Draft hood 7 is comprised of a rear panel 8 and side panels 9. As shown in FIG. 2, side panels 9 are generally triangular in shape with their front surface sloping rearwardly in order to allow full and unobstructed access to the interior of housing 2. Draft hood 7 acts as a means to prevent wind from blowing across housing 2 and to prevent the loss of heat and the cooling of food being cooked in the barbecue. In addition, side panels 9 have holes 73 for receiving a rotisserie while draft hood 7 has corresponding slots 74 to allow the hood to be closed over a rotisserie.

Also shown in FIGS. 1 and 2 is a rotationally operable lid 10. Lid 10 pivots upon pins 11 mounted in side panels 9 of draft hood 7. When in its closed position as shown in FIG. 1, lid 10 completely encloses the upper portion of housing 2 to retain heat and any smoke or vapours produced by the barbecue. A handle 12 allows for the opening and closing of lid 10 during operation of the barbecue.

Mounted on the front of housing 2 is a control panel 14 for receiving gas control means 15. In the preferred embodiment, gas control means 15 comprises rotary valves 16 that regulate the flow of gas from a storage tank or supply line (not shown) to a burner assembly 17. Valves 16 are used to prevent the escape of gas when the barbecue is not in use and allow the operator to adjust the amount of gas flowing to the burner assembly, thereby controlling the amount of heat generated by the barbecue when in operation.

Looking specifically at the configuration of burner assembly 17, the burner comprises an elongate tube burner 18 having a first end 19 and a second end 20. First end 19 is connected to one of the rotary valves 16 to regulate the flow of gas therethrough. Second end 20 is enclosed to prevent the escape of gas. In the preferred embodiment second end 20 is crimped to both enclose the end and also to provide a method for attaching elongate tube burner 18 to housing 2. As shown in FIG. 2, the crimp 21 on second end 20 is generally horizontal allowing for tube burner 18 to rest upon an inwardly projecting flange 22 on housing 2. To firmly secure tube burner 18 in place crimp 21 is preferably fastened to flange 22 by a screw, bolt or weld.

To provide a means for gas to escape from tube burner 18 for the purpose of generating a flame, at least one row of apertures 23 extend along the periphery of tube burner 18. In the preferred embodiment, a row of generally evenly spaced apart apertures extends along both peripheral edges of tube burner 18 allowing for an even flame distribution on both sides of the burner.

Figure 12:
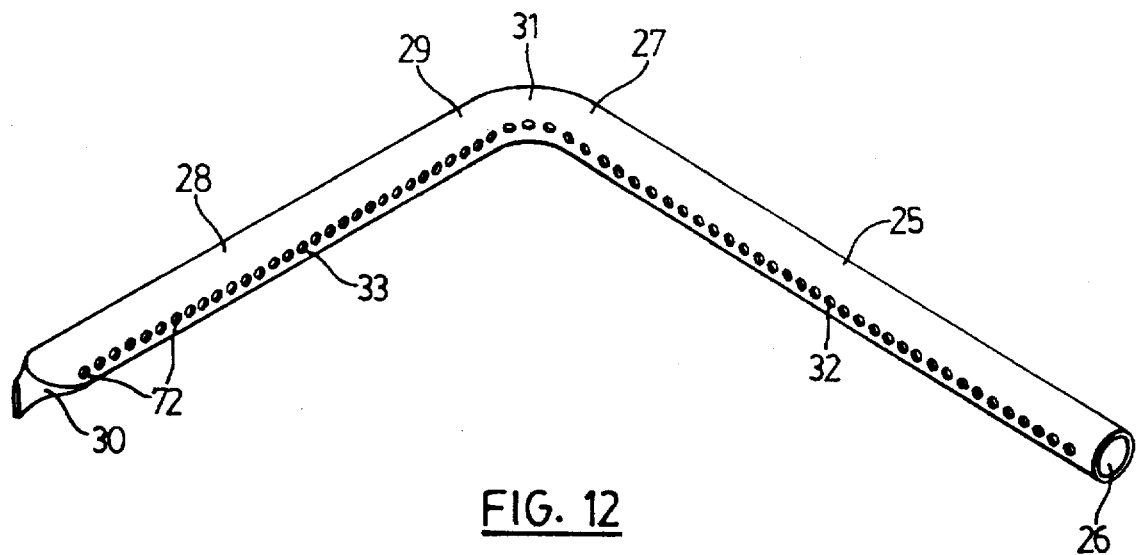
FIG. 12 is a detailed view of an L-shaped burner of the gas barbecue of the present invention.

Burner assembly 17 further comprises generally L-shaped tube burner 24. L-shaped tube burner 24 is itself comprised of a primary tube member 25 having first and second ends 26 and 27 respectively. A secondary tube member 28, having an intersecting end 29 and a free end 30, is joined to primary tube member 25 at an intersection point 31. The primary tube member 25 and secondary tube member 28 together comprise the continuous hollow L-shaped tube burner 24. As in the case of elongate tube burner 18, L-shaped tube burner 24 is connected to a rotary valve 16 at first end 26 with secondary tube member 28 resting on, and supported by, flange 22. Free end 30 is enclosed to prevent the escape of gas therefrom. For purposes of ease of manufacturing and reduced costs, free end 30 is preferably crimped shut in a similar manner as end 20 of tube burner 18. A more detailed view of L-shaped tube burner 24 is shown in FIG. 12.

Figure 11:
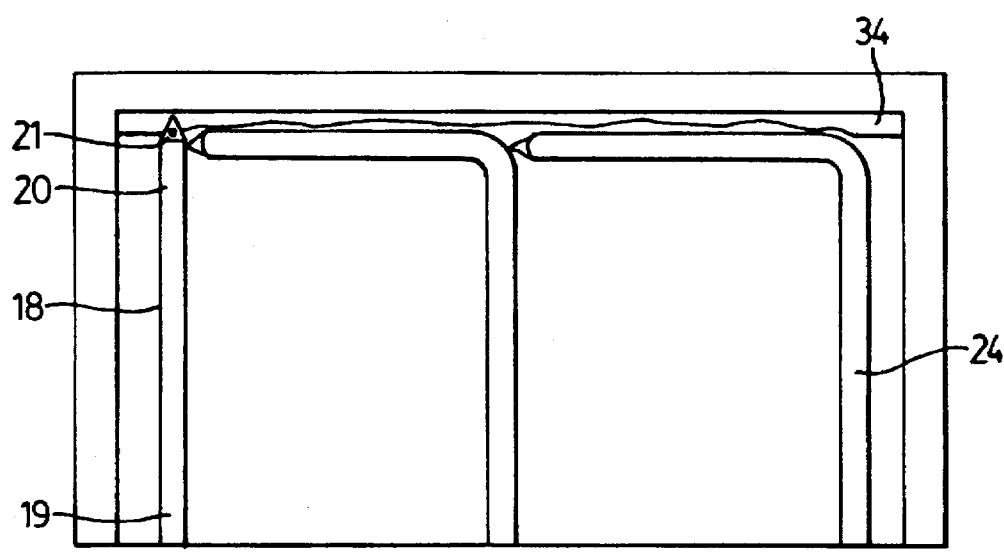
FIG. 11 is a plan view of the burner assembly of the gas barbecue of the present invention.

Referring to FIGS. 2 and 11, when positioned in housing 2 free end 30 of L-shaped tube burner 24 is in close proximity to second end 20 of elongate tube burner 18. Primary tube member 25 has at least one row of apertures 32 extending along each of its peripheral edges and secondary tube member 28 has one row of apertures 33 extending along its periphery edge adjacent to primary tube member 25. In FIG. 2 this single row of apertures 33 extending along the periphery edge of secondary tube member 28 is shown as being directed inwardly toward the open interior 5 of housing 2. It is important to note that in the preferred embodiment the size of apertures 32 on primary tube member 25 are relatively consistent and evenly spaced apart in order to produce a consistent and evenly distributed flame along the length of tube member 25. Since, as will be described, the primary purpose of secondary tube member 28 is for cross-ignition of L-shaped tube burner 24, the size of apertures 33 on secondary tube member 28 is smaller than the size of apertures 32. For the same reason, apertures 33 extend along only the interior peripheral edge of secondary tube member 28.

In operation one of rotary valves 16, connected to elongate robe burner 18, is opened so as to allow gas to enter tube burner 18 and be ignited by an external spark or flame. Under certain conditions the amount of food to be cooked on the barbecue is sufficiently small to require only the ignition of tube burner 18. However, where a larger heated cooking area is required a second rotary valve 16, connected to L-shaped robe burner 24, is opened to allow the flow of gas therethrough. Since the end 30 of L-shaped tube burner 24 is crimped closed, back pressure will be created within burner 24 forcing gas through apertures 32 and 33. As free end 30 of L-shaped tube burner 24 is positioned in close proximity to second end 20 of elongate tube burner 18, gas escaping through apertures 33 will be ignited by elongate tube burner 18 thereby causing cross-ignition of L-shaped tube burner 24. The ignition of gas flowing through apertures 33 will cause an almost instantaneous ignition of gas flowing through apertures 32 on both peripheral edges of tube member 25. It will thus be appreciated that the function of apertures 33 on secondary tube member 28 is primarily to propagate a flame from elongate tube burner 18 to primary tube member 25 of L-shape tube burner 24. The heat generated by the flame produced from gas escaping through apertures 72 is of less importance, thus the reason that apertures 33 are smaller than apertures 32. To facilitate in the cross-ignition of L-shaped tube burner 24, the apertures 72 that are positioned directly on free end 30 of secondary tube member 28 would typically be slightly larger in size to allow a larger volume of gas to escape and to ensure quick and certain ignition.

Depending upon the size of the barbecue, and the required cooking area, a number of L-shaped tube burners 24 may be used in sequence. The particular configuration shown in FIG. 2 contains two such burners, however, 1, 2, 3 or more burners could equally be utilized. Where a plurality of L-shaped tube burners 24 are positioned adjacent to one another in housing 2, the free ends 30 of successive burners 24 are placed in close proximity to first ends 26 of the primary tube member 25 for the immediately preceding burner 24. In this manner each successive L-shaped tube burner 24 operates in the same manner as the first. However, rather than being cross-ignited from elongate tube burner 18, successive L-shaped tube burners 24 are cross-ignited from their preceding L-shaped tube burner. Otherwise, the successive L-shaped tube burners operate precisely the same as described.

As discussed, apertures 33 in secondary tube member 28 are (with the exception of those positioned at end 30) smaller than apertures 32 on primary tube member 25. As also discussed, the reason for this is that the primary function of secondary tube member 28 is to cross-ignite L-shaped tube burner 24. This being the primary function of secondary tube member 28, there is little reason for the use of large apertures that would create a large and unnecessary flame. However, since apertures 33 are relatively small they could become clogged or restricted should grease drippings be allowed to fall upon them during the cooking process. Accordingly, a baffle 34, that extends inwardly into open interior 5 and across the length of housing 2, is used to shield and protect secondary tube members 28.

It will be appreciated by those skilled in the art that through adjusting the fuel to air mixture in the burners 18 and 24, either natural gas or propane can be used as the primary source of fuel. The relatively light density of the gas relative to air allows baffle 34 to serve the further function of assisting in the cross-ignition of L-shaped tube burners 24. That is, gas expelled through apertures 33 on secondary tube member 28 will tend to collect in the area immediately below baffle 34 thereby increasing the amount of gas surrounding secondary tube member 28 and enhancing cross-ignition.

Figure 3:
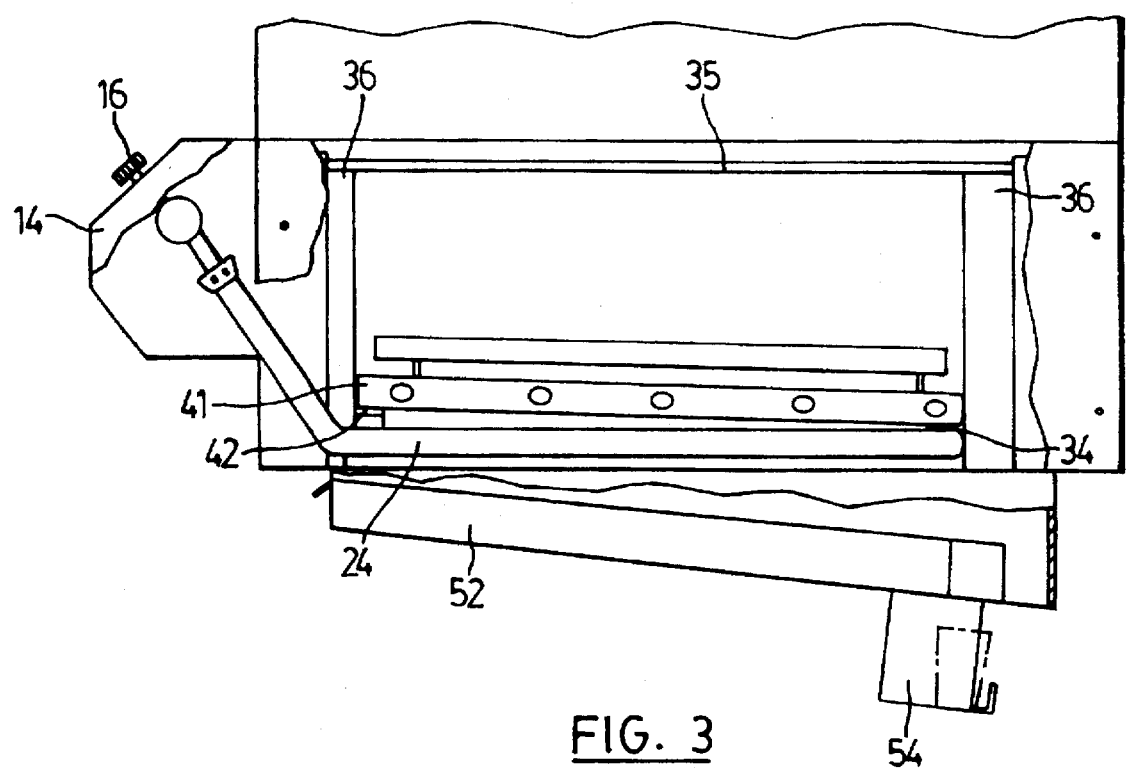
FIG. 3 is a partial side sectional view of the gas barbecue shown in FIG. 1 with a potion of the side housing removed.

In order to support food to be cooked on barbecue 1, housing 2 includes first support means 36 to accommodate a cooking grill 35. As shown in FIGS. 2 and 3, first support means 36 are preferably positioned toward the top proportion of housing 2, thereby offsetting cooking grill 35 from burners 18 and 24 so as to prevent the scorching of food in the event of any grease flare ups. The particular configuration of cooking grill 35 is more clearly shown in FIGS. 6 and 7.

Figure 6:
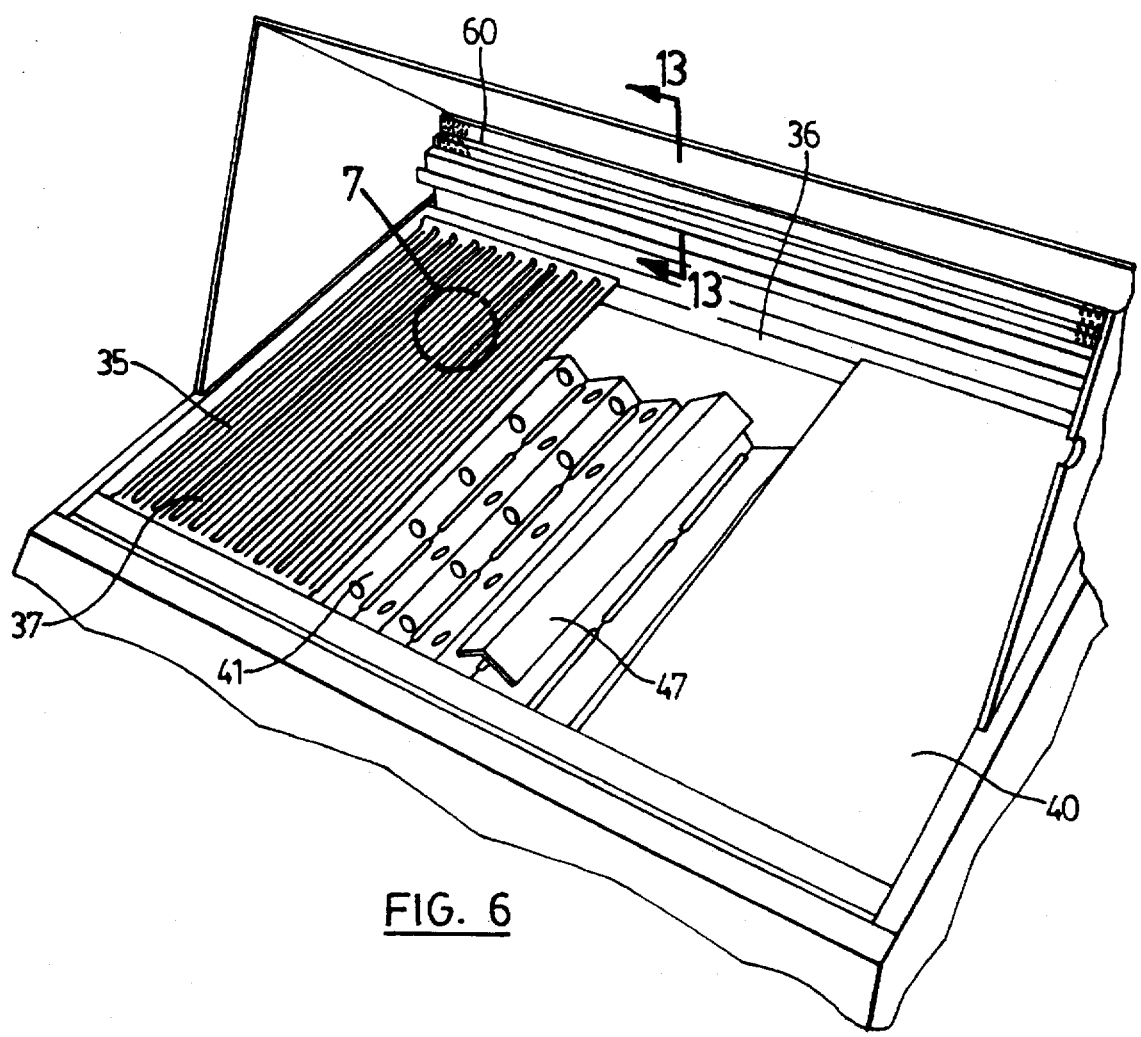
FIG. 6 is a partial plan view of the interior of the gas barbecue of in FIG. 1 showing its internal components.
Figure 7:
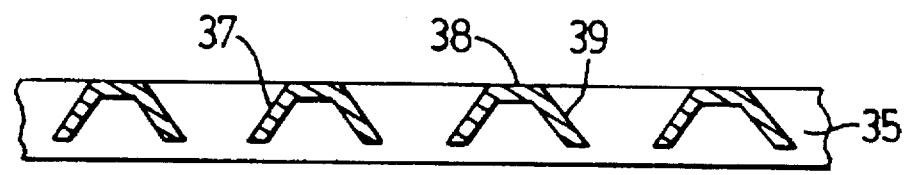
FIG. 7 is an enlarged detailed and sectional view of the cooking grill identified by area "7" in FIG. 6.
Figure 9:
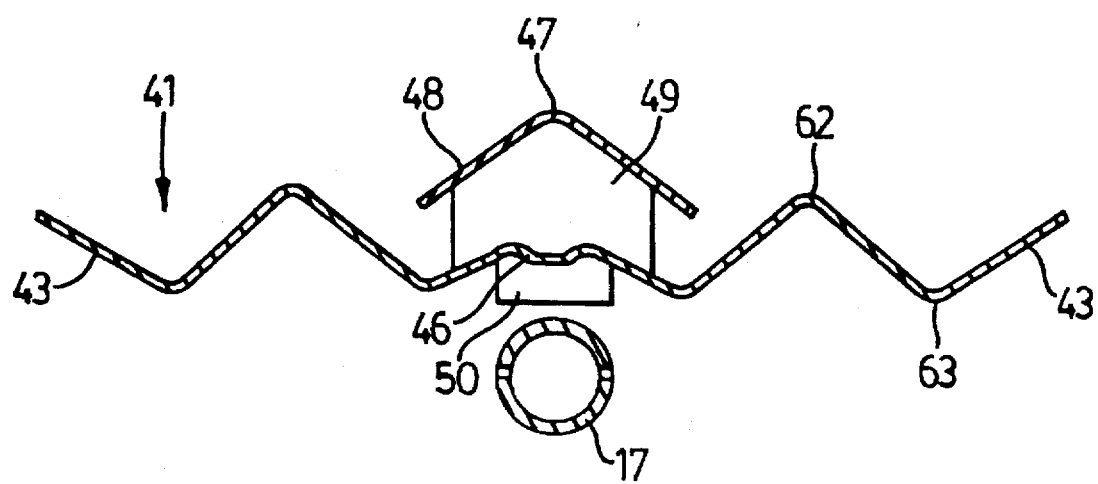
FIG. 9 is a vertical section of the sear plate and grease deflector shown in FIG. 8 wherein the grease deflector is attached to the sear plate.
Figure 8:
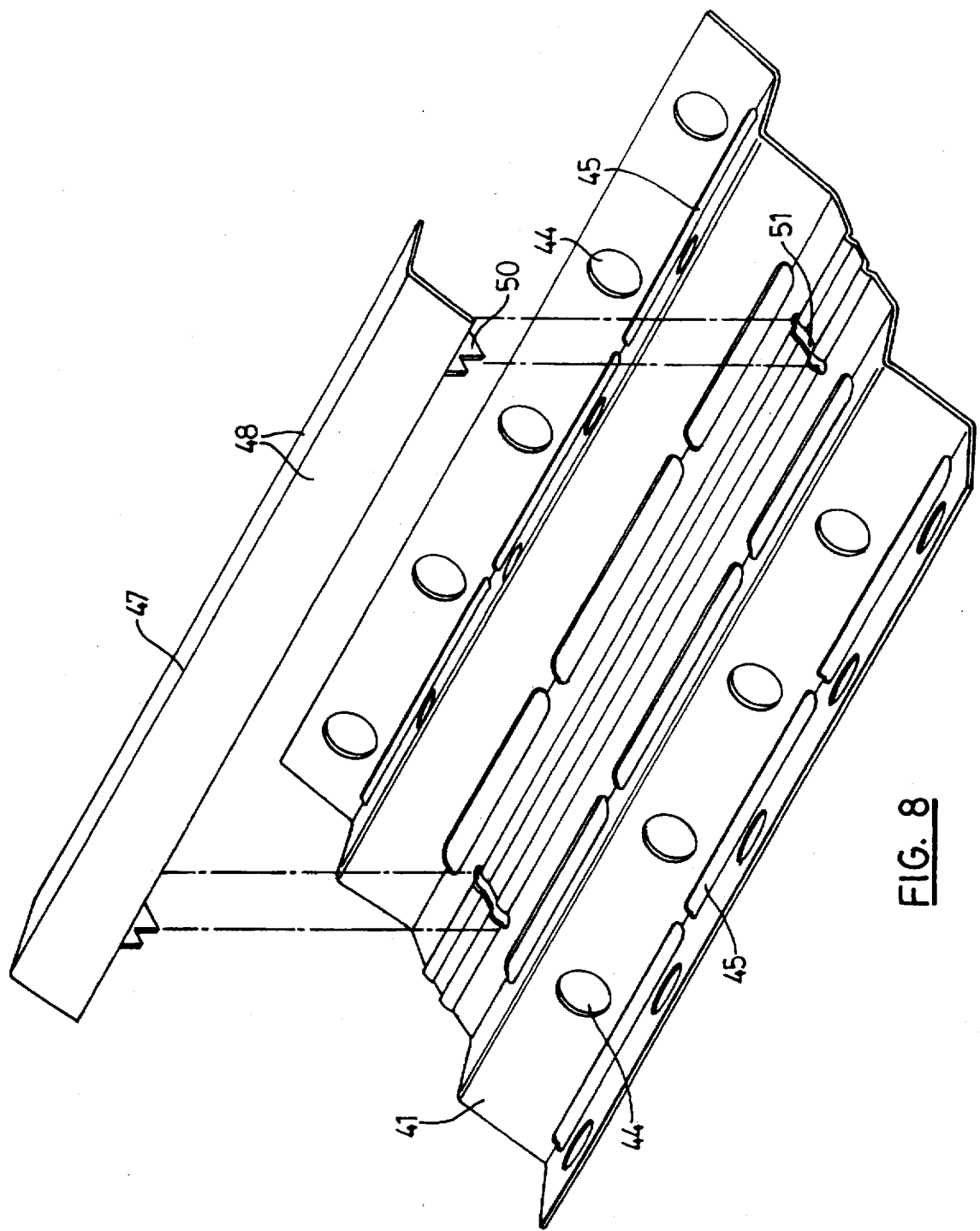
FIG. 8 is a perspective view of a sear plate from the gas barbecue according to the present invention.

Cooking grill 35 comprises a series of longitudinal, spaced apart, rails 37. Rails 37 have a generally flat upper surface 38 and a pair of downwardly depending side surfaces 39. The flat upper surface 38 is of a sufficient width to provide adequate support for food placed on grill 35 to prevent the food from being pushed into rails 37 during the cooking process. Flat upper surfaces 38 also retain heat trapped between side surfaces 39 and thereby help to sear the exterior of food placed upon grill 35. In the case of meat products, this searing of the outside surface of the food aids in retaining the natural juices and fluids within the meat to prevent drying out during cooking. The width of upper surfaces 38 results in wide sear marks on meat cooked in the barbecue; a desirable quality of barbecued meat. As shown in FIGS. 6 and 7, the longitudinal spaces between rails 37 allow for the unrestricted flow of heat upwardly from burners 18 and 24.

For ease of production and to minimize costs, cooking grill 35 may be formed from a single sheet of metal and may be porcelainized to both prevent oxidation and reduce the tendency of food to stick. Cooking grill 35 may also be formed in multiple parts to allow for easier cleaning in a standard dishwasher. In order to assist in the removal and cleaning of cooking grill 35, in the preferred embodiment a series of modular and identical grills 35 are positioned adjacent to one another on first support means 36. Furthermore, to enhance the versatility of barbecue 1, a griddle unit 40 may be used in place of one of the cooking grills 35. As shown in FIG. 6, griddle 40 is substantially the same size as cooking grill 35 and is also supported by first support means 36. Alternately, modular steaming pans, spits, rotisseries or other such accessories may be used in place of one or more of grills 35.

Referring now to FIGS. 3, 6, 8, and 9, a sear plate 41 is shown as being positioned between cooking grill 35 and burners 18 and 24. The front portion of sear plate 41 is adjacent to control panel 14 and rests upon second support means 42 which projects inwardly into open interior 5. The rear portion of sear plate 41 rests upon baffle 34. As shown more clearly in FIGS. 8 and 9, sear plate 41 is comprised of a series of adjacent and connected wall portions 43 that together form an undulating or wavy surface of elongate ridges 62 and troughs 63. The undulating surface of sear plate 41 serves to increase the surface area of the sear plate, provides areas for grease that drips from food to fall upon and be vaporized, and increases the rigidity and strength of the plate.

Sear plate 41 is preferably comprised of a heat conductive material such that heat generated by burners 18 and 24 is conducted evenly through the sear plate and radiated evenly and upward from sear plate 41 to cooking grill 35. The close proximity of sear plate 41 to burners 18 and 24 causes sear plate 41 to achieve a sufficiently high temperature to vaporize grease and fat drippings. The vaporized drippings then rise upwardly to enhance the flavour of food being cooked on grill 35.

In the preferred embodiment, a single sear plate 41 may be used that extends across the entire housing 2 above burners 18 and 24. However, in the alternative, a series of similar sear plates may be positioned adjacent to one another across the housing to effectively perform the same function. The use of multiple sear plates also enables the plates to be more easily cleaned. It will be appreciated that by substantially encompassing the entire burner assembly and spanning the interior of housing 2, sear plate 41 further acts to distribute heat generated by burners 18 and 24 throughout housing 2 and evenly across cooking grill 35. That is, through the use of sear plate 41 the localized "hot spots" that are generated immediately surrounding elongate tube burner 18 and L-shaped tube burners 24 are reduced resulting in a more evenly heated cooking surface and better performance. To assist in the escape of heat from beneath sear plate 41, a plurality of holes 44 extend through the upper surface of plate 41. Holes 44 are distributed in such a fashion across sear plate 41 to prevent localized hot spots developing on the plate.

In the preferred embodiment sear plate 41 is comprised of a single piece of metal which has been formed into the undulating surface of elongate ridges and troughs as described. In order that grease drippings remain in contact with the surface of plate 41 for an optimum amount of time to allow for vaporization, wall portions 43 are constructed such that the angle between adjacent wall portions is obtuse. It has been found that for this purpose the optimum angle between adjacent wall portions 43 is approximately 100 to 110 degrees. Significantly greater angles have been found to tend to cause the pooling of grease drippings since wall portions 43 are not inclined enough to optimize the effect of gravity on the movement of the grease. At the same time, angles significantly less than this range have been found to cause grease drippings to run down the sides of wall portions 43 too quickly to allow for vaporization. Grease drippings that are not vaporized after running down wall portions 43 flow through passageways 45 in troughs 63 so as to prevent the accumulation of excessive pools of grease and remove the fire hazard associated therewith.

A further function of sear plate 41 is to prevent grease from falling directly upon burners 18 and 24. If grease were allowed to fall upon an ignited burner, a flare up or grease fire could result. Grease falling on a burner that has not been ignited may clog the apertures preventing proper function when the burner is ignited. Accordingly, in addition to undulating wall portions 43 sear plate 41 also includes a burner tube covering portion 46 which is relatively flat, when compared to the remainder of sear plate 41. Sear plate 41 is also constructed such that when positioned in housing 2 a burner tube covering portion 46 is positioned immediately above each of burners 18 and 24 (see FIG. 9). Burner tube covering portions 46 thereby help prevent the dripping grease from coming into direct contact with either burners 18 and 24, or an open flame.

To further assist in the prevention of grease flare ups and fires, a grease deflector 47 is mounted over each burner tube covering portion 46. Grease deflectors 47 are comprised of a pair of elongate smooth solid sloping surfaces 48 that are joined along a common edge forming an obtuse angle therebetween. As will be appreciated from a review of FIGS. 6, 8, and 9, grease that drips downwardly tube either elongate tube burner 18 or L-shaped tube burners 24 will fall upon surfaces 48 of grease deflector 47. Since surfaces 48 are solid with no holes therethrough, the grease cannot pass directly onto the burner assembly. If grease deflector 47 has been heated to a sufficient degree the grease will vaporized, otherwise it will merely run down along the sides of surfaces 48 and thereafter either fall upon sear plate 41 or fall through passageways 45.

Attachment means 49 are use to mount grease deflectors 47 above burner tube covering portions 46. In the preferred embodiment attachment means 49 comprises a pair of leg members 50 having one end fixed to smooth surfaces 48 and the other end received in slots 51 in sear plate 41 (see FIG. 8). In this manner legs 50 provide a means to off-set grease deflector 47 vertically above sear plate 41 and allow grease deflectors 47 to be easily removed for cleaning purposes.

It will be appreciated by those skilled in the art that while sear plate 41 has been described as a substitute for conventional lava rock, some individuals will prefer to use lava rock in barbecues. For this reason the inherent strength of sear plate 41, grease deflectors 47, baffle 34 and second support means 42 is sufficient to hold lava rock placed on sear plate 41 if an operator prefers to use the barbecue in conjunction with lava rock.

Grease that is not vaporized by either sear plate 41 or grease deflector 47 passes through holes 44 and passageways 45 and is collected in a grease tray 52 positioned below burners 18 and 24. To assist in the "flow" of grease through holes 44 and passageways 45, sear plate 41 is preferably sloped slightly toward the rear of the barbecue. It should, however, also be appreciated that sear plate 41 could be sloped toward the front, or sides, or could be substantially horizontal.

Figure 4:
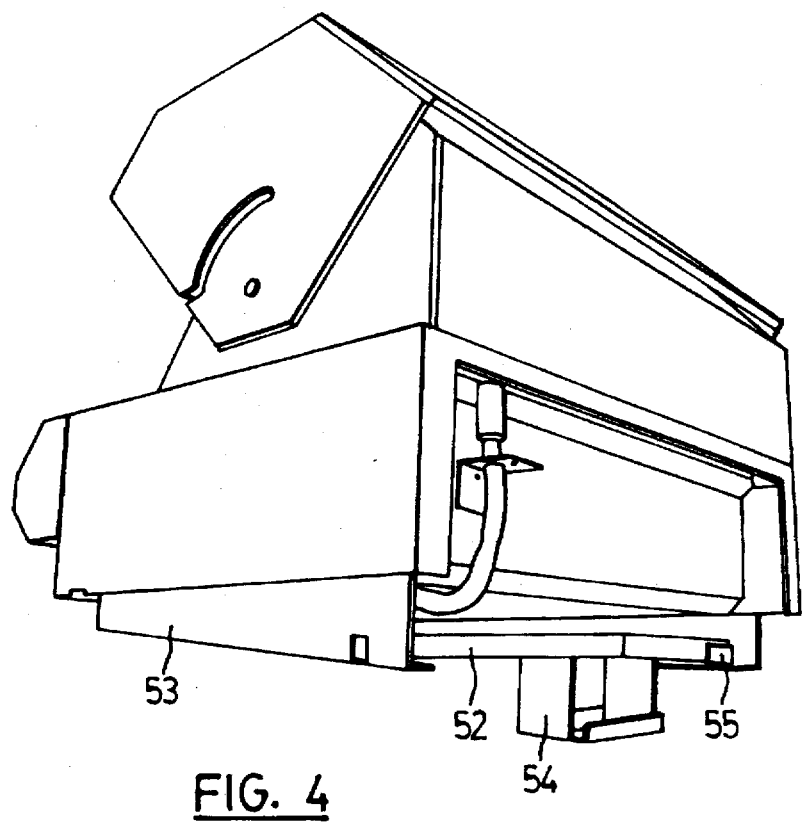
FIG. 4 is a perspective view of the gas barbecue shown in FIG. 1 taken from a point below and behind.
Figure 5:
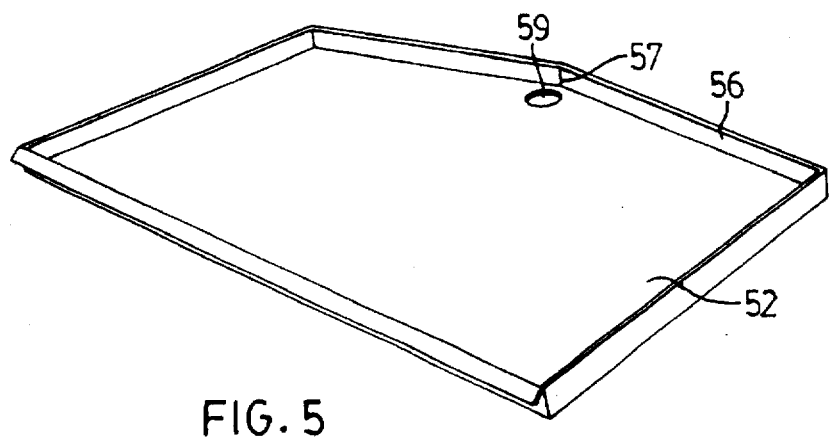
FIG. 5 is a perspective view of the grease tray from the gas barbecue according to the present invention.

Grease tray 52 is held in a track 53 which forms part of housing 2. Grease tray 52 thereby effectively represents the bottom of housing 2. As shown in FIGS. 3 and 4, grease tray 52 includes means 54 to hold a collection vessel (not shown) to collect and dispose of excess grease. In order to encourage grease falling into grease tray 52 to flow into the collection vessel, track 53 is sloped toward the rear of housing 2 resulting in grease tray 52 being held in a declined position. Stop tabs 55 prevent grease tray 52 from sliding out the rear of track 53. In addition, the rear edge 56 of grease tray 52 extends outwardly to a central apex 57. When placed on declined track 53, grease running along the surface of tray 52 will come into contact with the outwardly projecting rear edge 56 and be forced toward apex 57. Positioned immediately adjacent to apex 57 is a hole 59 through which the grease may then fall to be collected in the collection vessel.

It will also be appreciated that the configuration of grease tray 52 and tack 53 is such that the tray has a low profile and occupies a relatively small amount of space under the barbecue. This is significant as many barbecues utilize larger centralized hoppers or centralized grease vessels that occupy a significant amount of space vertically below the barbecue housing. These types of barbecues do not readily lend themselves to encasement within a brick island and reduce the amount of storage space available beneath the barbecue. The low profile, shallow grease tray 52 according to the present invention avoids such problems.

In addition to burners 18 and 24, barbecue 1 includes an upper radiant burner 60. Radiant burner 60 (which is shown generally in FIGS. 2 and 6) is positioned at the rear of housing 2 above cooking grill 35. As in the case of burners 18 and 24, gas is provided to radiant burner 60 through rotary valve 16 located on control panel 14. To ignite radiant burner 60 an electric ignition means 61 is used. Electric ignition means 61 would typically comprise a device that delivers an electric spark to radiant burner 60 and ignites gas supplied therethrough. In the preferred embodiment, electric ignition means 61 is also used to ignite elongate tube burner 18.

Figure 10:
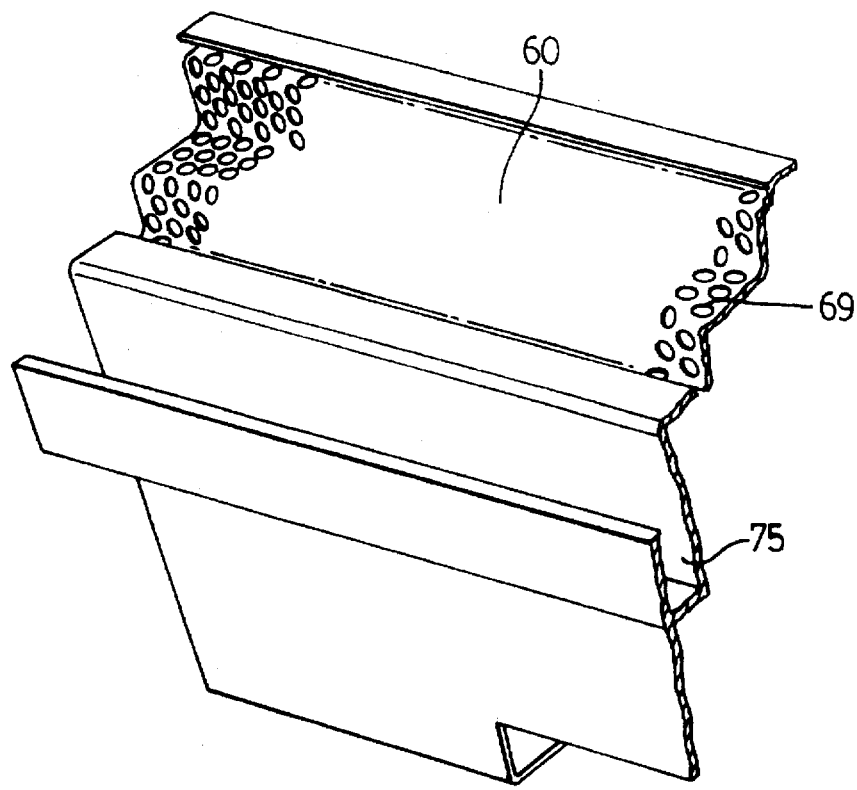
FIG. 10 is an enlarged detailed view of the radiant burner identified by area "10" in FIG. 2.
Figure 13:
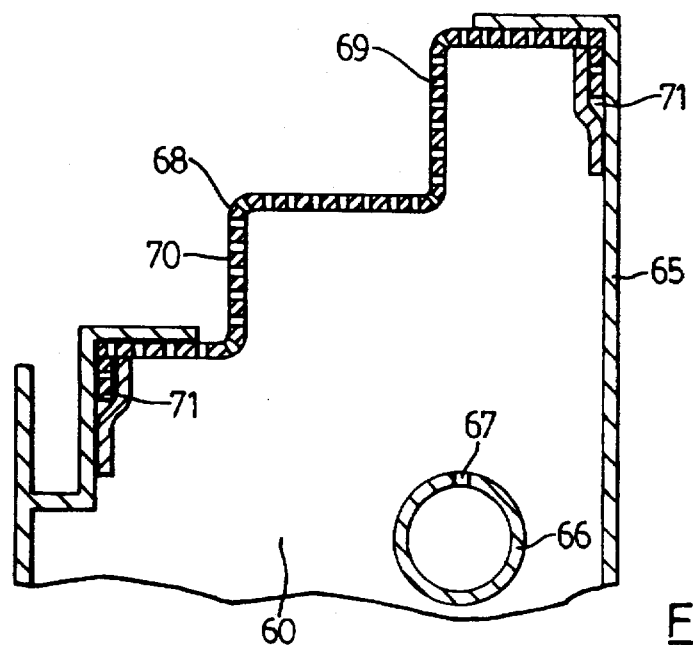
FIG. 13 is a cross-sectional view taken along the line 13—13 in FIG. 6.

Referring specifically to FIGS. 10 and 13, radiant burner 60 is comprised primarily of a frame 65, a radiant robe burner 66, and radiating means 68. In operation, gas that is supplied to radiant tube burner 66 escapes through orifices 67 where it may be ignited by electric ignition means 61 as described previously. The resulting flame heats radiating means 68 which in turn radiates infrared heat toward grill 35. Through providing infrared heat as opposed to directly heating the cooking area by means of a flame, a more even heat distribution is produced tending to cook foods more slowly and without the customary charing or burning that can result from cooking over an open flame. This type of radiant or infrared heat tends to be particularly useful when cooking large pieces of meat or when using a rotisserie attachment.

In order to increase the efficiency of radiant burner 60, and to maximize its infrared output, radiating means 68 is preferably comprised of a perforated stainless steel mesh 69. The perforations in mesh 69 serve to both increase the surface area of the mesh and also to allow excessive heat and combustion products that may build up in the burner to readily escape. The increased surface area assists in the radiation of heat into the interior of the cooking area while heat that passes through the holes in the mesh uniformly and quickly heats the mesh until it glows with a red colour. When the mesh is heated to a glowing red colour, the operator knows that infrared heat is being radiated toward grill 35.

As is more clearly shown in FIG. 13, mesh 69 is formed in a stepped configuration so as to present faces 70 which are angled to radiate heat directly toward food being cooked in the barbecue. In addition, this stepped configuration helps to prevent distortion in the mesh when it is heated. Mesh 69 "floats" loosely within slots 71 formed in burner frame 65. This floating arrangement both simplifies the manufacture and assembly of the radiant burner and also allows for expansion and contraction of mesh 69.

Referring to FIGS. 10 and 13, radiant burner 60 is shown as also comprising a channel 75 positioned generally along its from edge. Channel 75 provides a means to receive wood chips to deliver a "smoked" flavour or aroma to food cooked in barbecue 1. When wood chips are placed in channel 75 and radiant burner 60 is ignited, the chips are slowly charred causing a flavourizing smoke to fill the barbecue.

Finally, a review of the construction of barbecue 1 as shown in FIGS. 1 through 4 will indicate that it is readily adaptable to be supported on a cart for mobile use. Barbecue 1 may also be permanently built into a cabinet or brick island.

It is to be understood that what has been described is the preferred embodiment of the invention and that it is possible to make variations to this embodiment while staying within the broad scope of the invention. Some of these variations have been discussed while others will be readily apparent to those skilled in the art to which this invention relates.

I claim:

1. A gas barbecue comprising:
a housing having a generally rectangular shape with opposing side and end walls, an open interior and an open top; a plurality gas control means; a cooking grill; and a burner assembly, said burner assembly comprising an elongate tube burner, having first and second ends, said elongate tube burner having at least one row of apertures extending along each of its peripheral edges and having said first end connected to a first gas control means and said second end fastened to said housing, and at least one generally L-shaped tube burner comprised of a primary tube member, having first and second ends and having at least one row of apertures extending along each of its peripheral edges, and a secondary tube member, said secondary tube member having an intersecting end and a free end, said intersecting end of said secondary tube member being joined to said second end of said primary tube member to form a continuous tube burner having said generally L-shape, said secondary tube member having one row of apertures extending along its peripheral edge adjacent said primary tube member, said L-shaped tube burner positioned within said housing such that said first end of said primary tube member is connected to a second gas control means and said free end of said secondary tube member is in close proximity to said second end of said elongate tube burner such that ignition of said elongate tube burner causes cross-ignition of said L-shaped tube burner when gas is supplied thereto by said second gas control means.

2. A gas barbecue as claimed in claim 1 having a plurality of said L-shaped tube burners, said L-shaped tube burners being positioned adjacent to one another in said housing such that said primary tube members are generally parallel to one another with said first ends of said primary tube members connected to said gas control means and said free ends of said secondary tube members in close proximity to said second ends of said primary tube members of adjacent L-shaped tube burners such that ignition of one of said L-shaped tube burners causes cross-ignition of said adjacent L-shaped tube burner when gas is supplied thereto.

3. A gas barbecue as claimed in claim 2 wherein said secondary tube member is free of apertures along its peripheral edge opposite to said primary tube member.

4. A gas barbecue as claimed in claim 3 including a baffle extending inwardly into said open interior of said housing and adjacent to said secondary tube members of said L-shaped tube burners, said baffle protecting said secondary tube members from grease dripping from said cooking grill.

5. A gas barbecue as claimed in claim 4 wherein said housing includes first support means to accommodate said cooking grill, said first support means positioned above said burner assembly.

6. A gas barbecue as claimed in claim 5 wherein said baffle further supports at least one sear plate positioned above said burner assembly and below said cooking grill.

7. A gas barbecue as claimed in claim 6 wherein said sear plate provides a means to distribute heat generated by said burners about said interior of said housing, said sear plate further providing a grease vaporizing surface to catch and sear grease drippings from food placed on said cooking grill.

8. A gas barbecue as claimed in claim 7 further including a grease tray to capture grease and material that passes through said housing, said grease tray held in a track on said housing and forming a bottom for said housing when positioned on said track.

9. A gas barbecue as claimed in claim 8 wherein said sear plate is sloped downwardly toward the rear of said housing.

10. A gas barbecue as claimed in claim 9 wherein said grease tray includes means to hold a collection vessel to retain grease and material that may fall into said grease tray.

11. A gas barbecue as claimed in claim 10 wherein said track is sloped toward the rear of said housing such that grease falling onto said grease tray will be directed to said means to hold a collection vessel.

12. A gas barbecue as claimed in claim 11 wherein said grease tray includes outwardly projecting rear edges that converge at a central apex to assist in the direction of grease to said means to hold a collection vessel.

13. A gas barbecue as claimed in claim 1, further comprising a radiant burner attached to said housing above said cooking grill, said radiant burner including a perforated metal mesh that when heated provides infrared heat to said open interior of said barbecue.

14. A gas barbecue as claimed in claim 1, having a fixed rear draft hood and a rotationally operable lid to expose and to cover said cooking grill.

15. A gas barbecue as claimed in claim 1, including electric ignition means to ignite said elongate tube burner and said radiant burner.

16. A gas barbecue as claimed in claim 4 wherein said baffle further provides a means for trapping and retaining gas to assist in the cross-ignition of said L-shaped tube burners.

* * * * *